US009766796B2

United States Patent
Noda (10) Patent No.: US 9,766,796 B2
(45) Date of Patent: Sep. 19, 2017

(54) INFORMATION PROCESSING APPARATUS, INFORMATION PROCESSING METHOD, AND PROGRAM

(75) Inventor: Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 107 days.

(21) Appl. No.: 13/466,659

(22) Filed: May 8, 2012

(65) Prior Publication Data

US 2012/0313896 A1    Dec. 13, 2012

(30) Foreign Application Priority Data

Jun. 7, 2011    (JP) ................................. 2011-127389

(51) Int. Cl.
*G06F 3/0488*    (2013.01)
*G06F 3/042*    (2006.01)
*G06F 3/0481*    (2013.01)

(52) U.S. Cl.
CPC ............ *G06F 3/0488* (2013.01); *G06F 3/042* (2013.01); *G06F 3/04815* (2013.01)

(58) Field of Classification Search
CPC .... G06F 3/042; G06F 3/033; G06F 2203/013; G06F 2203/014; G06F 2203/015; G06F 3/011; G06F 3/012; G06F 3/013; G06F 3/014; G06F 3/016; G06F 3/0416; G06F 3/0418; G06F 345/156; G06F 2203/04109; G06F 3/0421; G06F 3/0423; G06F 3/0428; G06T 15/00; G06T 17/00; G06T 17/20; G06T 19/00; G06T 19/20; G06T 15/06; G06T 2200/04; G06T 2200/08; A61B 6/466; A61B 8/466

USPC ......................... 345/1.1, 4, 156–173; 348/42
See application file for complete search history.

(56) References Cited

U.S. PATENT DOCUMENTS

| | | | | |
|---|---|---|---|---|
| 6,064,354 | A * | 5/2000 | DeLuca | G02B 27/22 345/419 |
| 6,243,054 | B1 | 6/2001 | DeLuca | |
| 6,559,813 | B1 | 5/2003 | DeLuca et al. | |
| 6,690,370 | B2 * | 2/2004 | Ellenby | G06T 15/20 345/419 |
| 6,853,935 | B2 * | 2/2005 | Satoh | A63F 13/00 702/94 |
| 7,427,996 | B2 * | 9/2008 | Yonezawa | G06T 19/006 345/629 |
| 8,334,837 | B2 * | 12/2012 | Radivojevic | G06F 3/0426 345/156 |
| 8,694,922 | B2 * | 4/2014 | Doyen | G06F 3/04845 715/835 |

(Continued)

FOREIGN PATENT DOCUMENTS

| | | |
|---|---|---|
| JP | 2005-196530 A | 7/2005 |
| WO | WO 00/02187 | 1/2000 |

OTHER PUBLICATIONS

Extended European Search Report issued Aug. 23, 2012, in Application No. / Patent No. 12167985.6-2224.

(Continued)

*Primary Examiner* — Grant Sitta
(74) *Attorney, Agent, or Firm* — Chip Law Group (57) ABSTRACT

An apparatus includes a sensor configured to detect an object in a space and a display control unit configured to control a display unit to display a reference object such that the reference object appears to be located in the space.

18 Claims, 11 Drawing Sheets

(56) References Cited

U.S. PATENT DOCUMENTS

| | | | |
|---|---|---|---|
| 8,970,478 B2* | 3/2015 | Johansson | G06F 3/011 345/1.1 |
| 2002/0041327 A1* | 4/2002 | Hildreth | G06T 7/593 348/42 |
| 2003/0142068 A1 | 7/2003 | DeLuca et al. | |
| 2004/0104935 A1* | 6/2004 | Williamson | G06F 3/012 715/757 |
| 2004/0183775 A1* | 9/2004 | Bell | G06F 3/011 345/156 |
| 2007/0125633 A1 | 6/2007 | Boillot | |
| 2008/0120577 A1* | 5/2008 | Ma et al. | 715/863 |
| 2008/0170123 A1* | 7/2008 | Albertson | A63B 24/0003 348/157 |
| 2008/0284729 A1* | 11/2008 | Kurtenbach | G02B 27/2271 345/156 |
| 2009/0077504 A1* | 3/2009 | Bell et al. | 715/863 |
| 2009/0096783 A1* | 4/2009 | Shpunt et al. | 345/419 |
| 2009/0102603 A1 | 4/2009 | Fein et al. | |
| 2010/0090948 A1* | 4/2010 | Oba et al. | 345/156 |
| 2010/0143578 A1* | 6/2010 | Reichelsheimer | B41M 3/144 427/7 |
| 2010/0295782 A1* | 11/2010 | Binder | 345/158 |
| 2011/0080470 A1 | 4/2011 | Kuno et al. | |
| 2011/0083106 A1 | 4/2011 | Hamagishi | |
| 2011/0164032 A1* | 7/2011 | Shadmi | 345/419 |
| 2011/0242305 A1* | 10/2011 | Peterson | G01S 15/003 348/77 |
| 2012/0113223 A1* | 5/2012 | Hilliges | G06F 3/00 348/46 |
| 2012/0170089 A1* | 7/2012 | Kim | G06F 3/011 359/9 |
| 2012/0194507 A1* | 8/2012 | Lee | G06F 1/1694 345/419 |
| 2012/0249762 A1* | 10/2012 | Exner | G06F 3/0304 348/61 |

OTHER PUBLICATIONS

Communication pursuant to Article 94(3) EPC, Application No. 12 167 985.6-1904 issued Nov. 30, 2015.
Office Action received for Chinese Patent Application No. 201210177745.6, mailed on Mar. 31, 2016, 17 pages of Office Action including 9 pages of English translation.
Office Action received for European Patent application No. 12167985.6, mailed on Jul. 1, 2016, 10 pages of office action.

* cited by examiner

INFORMATION PROCESSING APPARATUS, INFORMATION PROCESSING METHOD, AND PROGRAM

CROSS-REFERENCE TO RELATED APPLICATIONS

The present application is based upon and claims the benefit of priority under 35 U.S.C. §119 of Japanese Priority Patent Application JP 2011-127389 filed in the Japanese Patent Office on Jun. 7, 2011, the entire contents of which are hereby incorporated by reference.

BACKGROUND

The present disclosure relates to an information processing apparatus, an information processing method, and a program stored on a non-transitory computer readable medium.

At present, many information processing apparatuses are installed with a touch panel for a user to operate an object displayed in a display screen by directly touching the screen. The use of a touch panel enables the user to perform an intuitive operation, and has an advantage in that a user who is not familiar with an operation of a keyboard or a keypad can easily operate the apparatus.

Concerning such a technology, Japanese Patent Application Laid-Open No. 2010-157189 discloses an optical touch panel that a user can operate without directly touching with a finger.

SUMMARY

As described above, by installing the optical touch panel described in Japanese Patent Application Laid-Open No. 2010-157189, it has been possible to perform a gesture operation input without directly touching the touch panel.

However, in the case of performing the operation input in space without directly touching the touch panel, like the gesture operation input, the user finds it difficult to perceive an operable space area.

In light of the foregoing, the present disclosure proposes an information processing apparatus, an information processing method, and a program stored on a non-transitory computer readable medium that are novel and improved and can express a space area in which an operation is detected.

Accordingly, the present invention broadly comprises an apparatus, a method, and a non-transitory computer readable medium encoded with a program which causes the processor to perform the method. In one embodiment, the apparatus includes a sensor configured to detect an object in a space and a display control unit configured to control a display unit to display a reference object such that the reference object appears to be located in the space.

As explained above, according to the present disclosure, it is possible to express a space area in which an operation is detected.

DETAILED DESCRIPTION OF THE EMBODIMENT

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanations will be performed in the following order.
1. Outline of the information processing apparatus according to the present embodiment
2. Details of the information processing apparatus according to the present embodiment
  2-1. Configuration of the information processing apparatus
  2-2. Expression examples of a space area
3. Conclusion As explained above, a technology explained in the present specification is performed by the present embodiment described in "1. Outline of the information processing apparatus according to the present embodiment" and "2. Details of the information processing apparatus according to the present embodiment" described below. An information processing apparatus 10 and an information processing apparatus 20 explained in the present specification include:
A: an operation detecting unit (19) that detects an operation in space; and
B: a display control unit (11) that expresses, by a stereoscopic object, a space area in which an operation in space is detected by the operation detecting unit.

Figure 1:
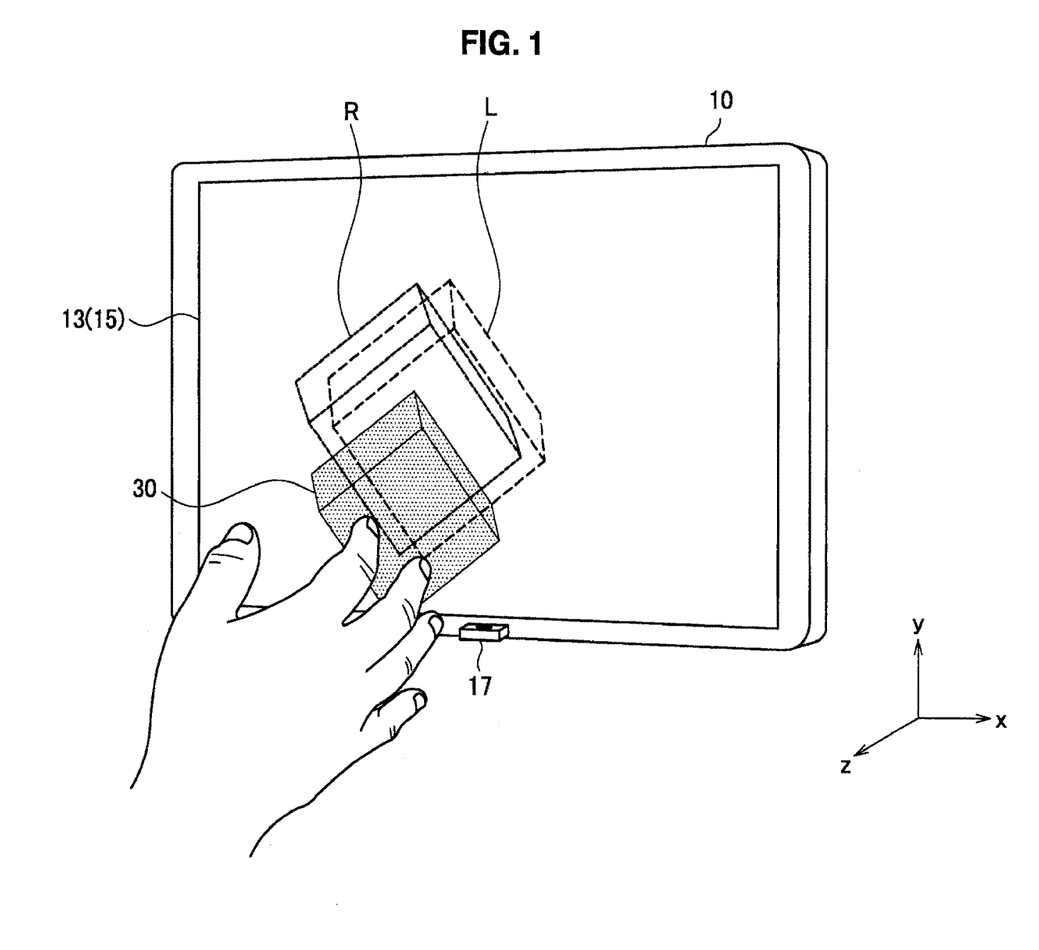
FIG. 1 is a view for explaining outline of an information processing apparatus 10 according to the present embodiment.

1. Outline of the Information Processing Apparatus According to the Present Embodiment First, an outline of the information processing apparatus 10 according to one embodiment of the present disclosure is explained with reference to FIG. 1. FIG. 1 is a view for explaining the outline of the information processing apparatus 10 according to the present embodiment. As shown in FIG. 1, the information processing apparatus 10 includes a display unit 13 and a camera 17.

The information processing apparatus 10 according to the present embodiment provides a stereoscopic object that a user can three-dimensionally and visually recognize. As a system for watching a stereoscopic object, a binocular disparity system that enables the user to watch a left-eye object L and a right-eye object R that have a parallax is going to be popular. As this binocular disparity system, there are broadly two kinds of systems including a glass system that uses glasses and a naked-eye system that does not use glasses. The naked-eye system includes a lenticular screen system that separates light paths of the left-eye object L and the right-eye object R by arranging barrel fine lenses (lenticular lenses), and a parallax barrier system that separates light paths of the left-eye object L and the right-eye object R by a longitudinal slit (a parallax barrier).

The information processing apparatus 10 according to the present embodiment provides a stereoscopic object by causing the user to watch a binocular disparity image by the naked-eye system, as an example. FIG. 1 shows the left-eye object L and the right-eye object R in the display unit 13, and shows a stereoscopic object 30 that the user perceives in front of these objects. The information processing apparatus 10 controls display of the stereoscopic object 30 according to a user operation in space.

The camera 17 included in the information processing apparatus 10 according to the present embodiment photographs the vicinity of the display unit 13. The information processing apparatus 10 detects the user operation in space based on an image photographed by the camera 17.

The information processing apparatus 10 may detect the user operation in space by using the operation input unit 15 that is integrated with the display unit 13. Alternatively, the information processing apparatus 10 may detect the user operation in space by using the operation input unit 15 and the camera 17, or may detect the user operation by using plural cameras and other sensors.

According to the information processing apparatus 10 described above, by displaying a two-dimensional image of a photograph in the display unit 13, the two-dimensional image of the photograph displayed can be switched according to a user operation that is detected in space, for example. The information processing apparatus 10 can also control a content of a display corresponding to a selection operation of an object to be detected in space, by displaying a stereoscopic object to be operated such as an icon and a thumbnail in the display unit 13.

However, because a general information processing apparatus has no means to transmit to the user a space area in which the user operation can be detected, the user finds it difficult to recognize the space area and perform a proper operation in the space area.

The information processing apparatus 10 according to the present disclosure expresses a space area in which a user operation can be detected by using a stereoscopic object. Such a configuration enables the user to clearly recognize the space area in which the information processing apparatus 10 can detect the user operation.

The outline of the information processing apparatus 10 according to the present disclosure is explained above. Next, details of the information processing apparatus 10 according to the present disclosure are explained with reference to drawings.

2. Details of the Information Processing Apparatus According to the Present Embodiment

2-1. Configuration of the Information Processing Apparatus

Figure 2:
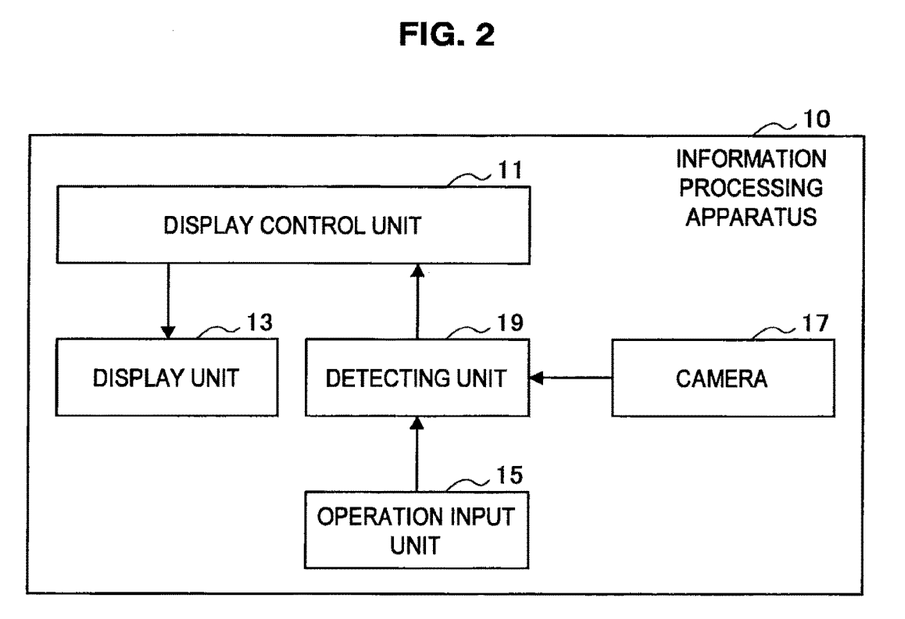
FIG. 2 is a block configuration diagram of the information processing apparatus 10 according to the present embodiment.

FIG. 2 is a block configuration diagram of the information processing apparatus 10 according to the present embodiment. As shown in FIG. 2, the information processing apparatus 10 includes a display control unit 11, a display unit 13, an operation input unit 15, a camera 17, and a detecting unit 19. Each configuration is explained below.

The display control unit 11 has a function of generating an image to be displayed in the display unit 13. For example, the display control unit 11 generates a binocular image that has a parallax, and outputs the generated binocular image to the display unit 13.

The display control unit 11 according to the present embodiment expresses a space area in which a user operation is detected with a stereoscopic object. Specifically, the display control unit 11 controls display such that the stereoscopic object is perceived in the space area. The display control unit 11 acquires three-dimensional coordinate information of the space area from a storage unit (not shown) or the detecting unit 19, and determines a range of the space area.

The stereoscopic object generates a distortion or a positional deviation based on the position of the user. Therefore, the display control unit 11 performs a display control of the stereoscopic object that expresses the space area, based on the position of the face of the user, for example. The position of the face of the user is detected based on an image photographed by a camera (not shown) that photographs the face of the user who is in front of the display unit 13, for example. Expression examples of the space area according to the stereoscopic object are explained in detail in [2.2 Expression examples of a space area].

The display unit 13 displays data that is output from the display control unit 11. For example, the display unit 13 three-dimensionally displays an object by displaying a binocular image having a parallax. A three-dimensionally displayed object may be a photograph or a video, or may be an image of an operation button or an icon. An object that the display unit 13 according to the present embodiment three-dimensionally displays is perceived at a surface portion of or inside the space area, and may be a particle or wave-shaped effect that expresses the space area.

The display unit 13 may be a display apparatus such as a liquid crystal display (LCD) and an organic electroluminescence (EL) display.

The operation input unit 15 receives an operation instruction by the user, and outputs an operation content of the operation to the detecting unit 19. The operation instruction by the user includes an operation instruction by a gesture operation, in addition to an operation to the object. When the operation input unit 15 is realized by a proximity sensor that detects a user operation in space, the operation input unit 15 outputs a result of detection by the proximity sensor as the operation content. The operation input unit 15 may be a proximity touch panel that is provided integrally with the display unit 13.

The camera 17 is an image sensor that detects a user operation in space, and outputs a photographed image to the detecting unit 19. The camera 17 is set with a photographing direction such that the camera 17 can photograph the vicinity of the display unit 13. Setting information of the photographing direction of the camera 17 may be stored in a storage unit (not shown), as information that indicates a space area in which a user operation is detected.

Figure 3:
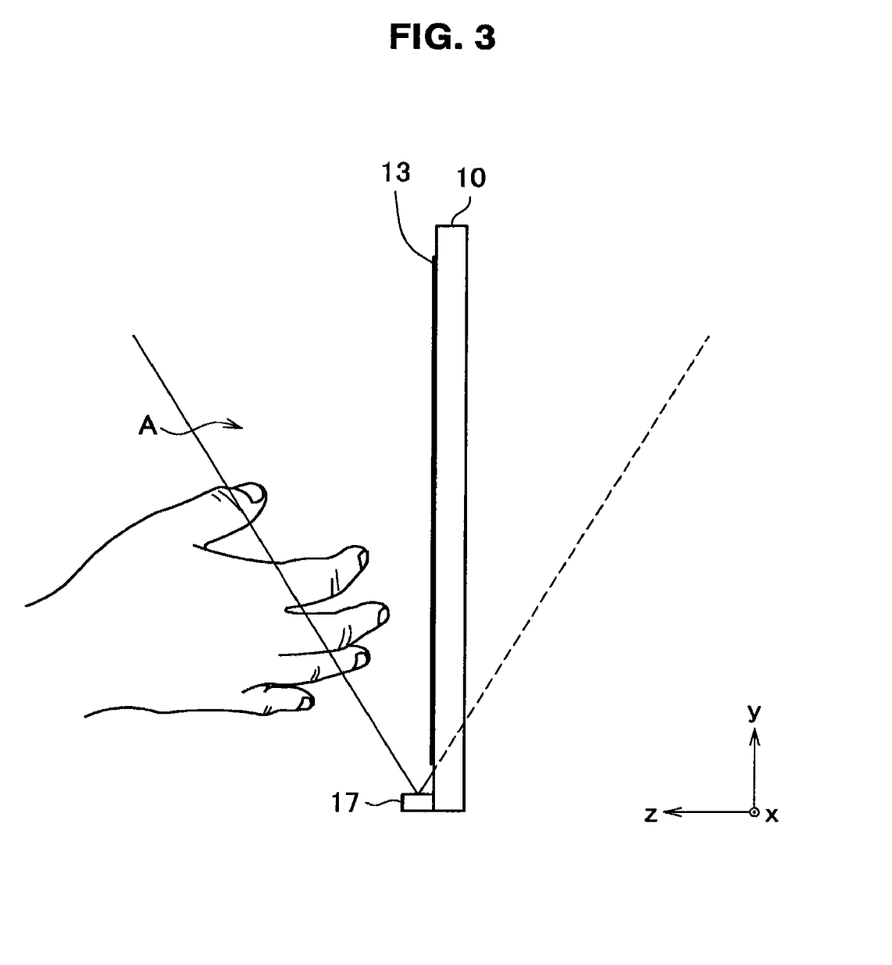
FIG. 3 is a schematic cross-sectional view for explaining a setting of a camera 17 according to the present embodiment.

A detailed setting example of the camera 17 is explained with reference to FIG. 3. FIG. 3 is a schematic cross-sectional view for explaining a setting of the camera 17 according to the present embodiment. As shown in FIG. 3, the camera 17 is set such that the camera 17 photographs a space in front of the display unit 13 from below, for example. With this arrangement, the camera 17 can photograph a user operation in space in a photographing area A. The camera 17 may be installed in the information processing apparatus 10 or may be externally provided.

Figure 4:
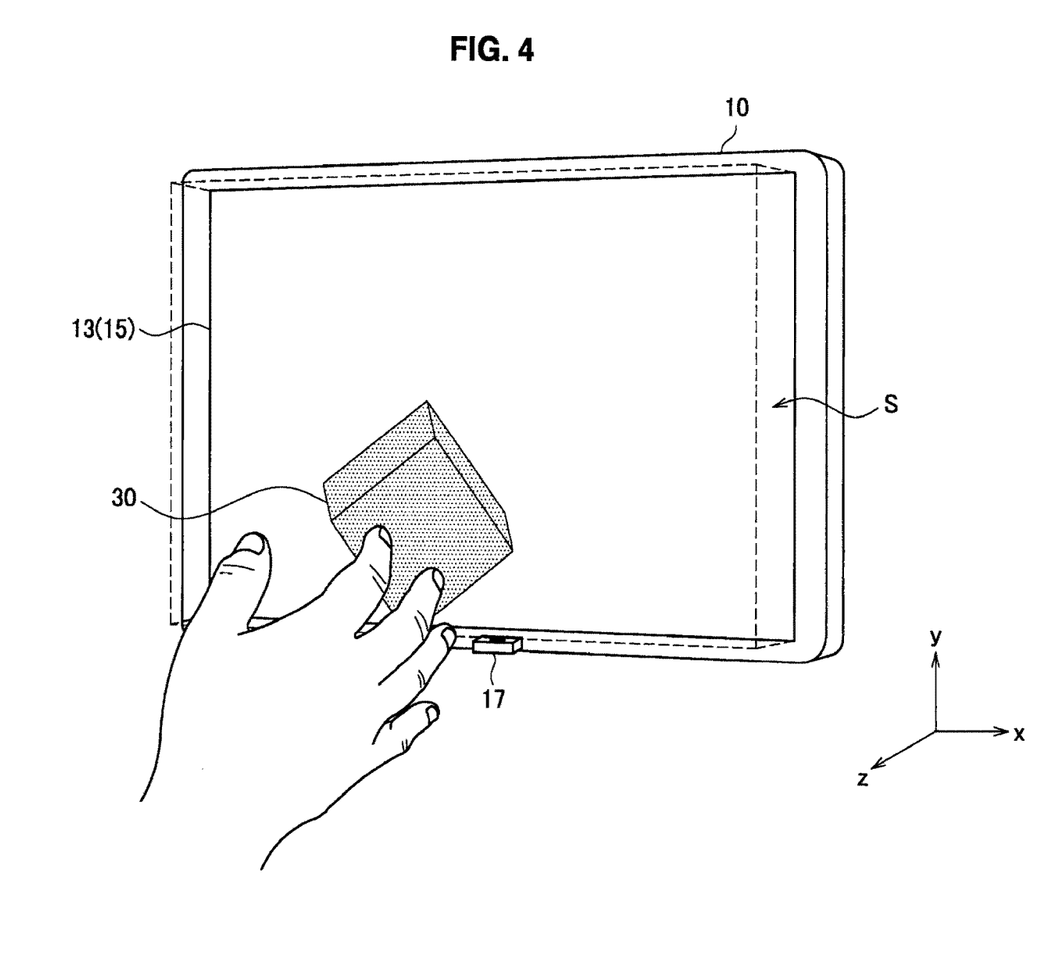
FIG. 4 is a view showing a space area S of the information processing apparatus 10 according to the present embodiment.

Although the width of the photographing area A in a z direction by the camera 17 is different at each position of the display unit 13 in a y direction as shown in FIG. 3, the image processing apparatus 10 according to the present embodiment may adjust a three-dimensional space area S in which a user operation can be detected, as shown in FIG. 4.

FIG. 4 is a view showing the space area S of the information processing apparatus 10 according to the present embodiment. As shown in FIG. 4, the information processing apparatus 10 may set a space in which a distance from the display unit 13 in the z direction is the same in a whole surface of the display unit 13, in the space area S in which a user operation can be detected. The space area S like this may be set by providing plural cameras 17, for example.

Figure 5:
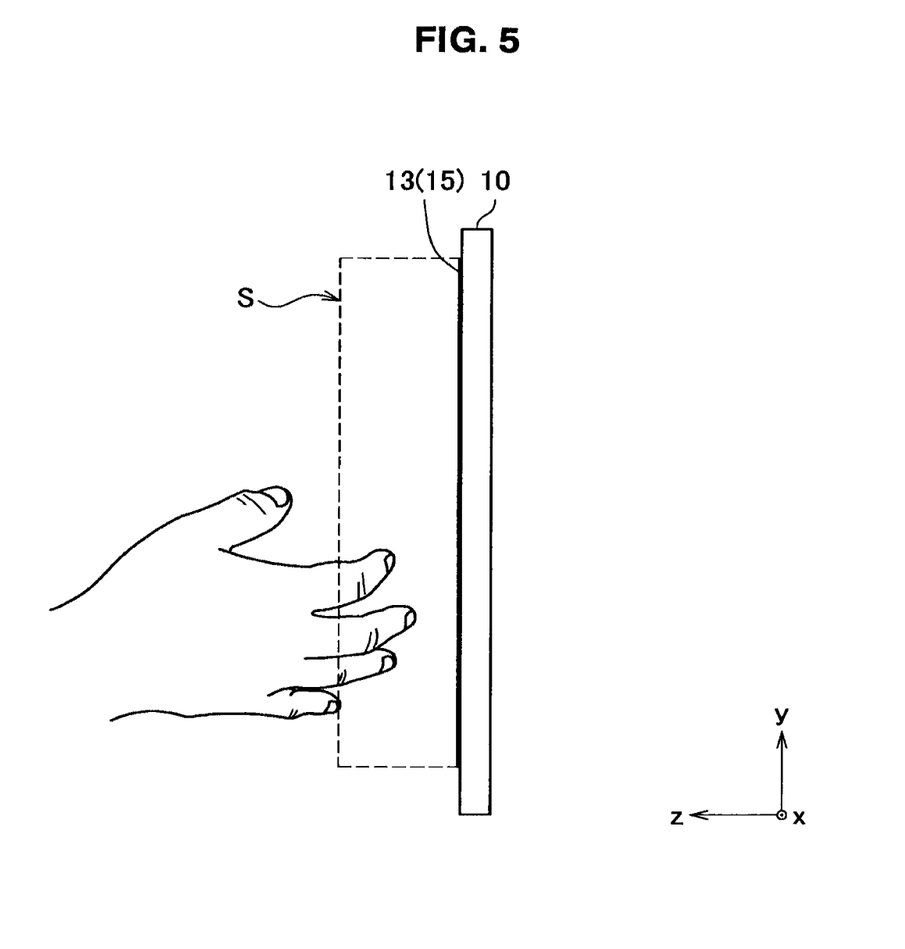
FIG. 5 is a schematic cross-sectional view showing the space area S that is set by an operation input unit 15 according to the present embodiment.

The space area S described above may be also set by the operation input unit 15 that is integrated with the display unit 13. FIG. 5 is a schematic cross-sectional view showing the space area S that is set by the operation input unit 15. As shown in FIG. 5, when the operation input unit 15 is a proximity touch panel that is provided integrally with the display unit 13, for example, the width of the space area S in the z direction is the same at each position of the display unit 13 in the y direction.

The information processing apparatus 10 may also set the space area S shown in FIG. 4, by using both the camera 17 and the operation input unit 15.

The detecting unit 19 is an operation detecting unit that detects a user operation in space, based on an operation content that is input from the operation input unit 15 (for example, a result of detection by the proximity sensor) or based on a photographed image that is input from the camera 17. The detecting unit 19 according to the present embodiment can detect input of an operating object such as a user hand in the space area S in which a user operation can be detected, and can detect a three-dimensional position of the operating object.

A three-dimensional position of the operating object is detected by the detecting unit 19 based on a photographed image that is photographed by the camera 17, for example. Specifically, the detecting unit 19 detects an operating object such as a shape of a user hand and a finger tip from the photographed image, converts a detected operating object into three-dimensional coordinates based on XY coordinates and the size of the detected operating subject in the photographed image, and detects a three-dimensional position of the operating object.

Detection of a three-dimensional position of an operating object is not limited to a case that is based on a photographed image. For example, the detecting unit 19 may detect a three-dimensional position of an operating object based on an operation content that is input from the operation input unit 15. Specifically, the detecting unit 19 detects a three-dimensional position of an operating object, based on an operation content from the operating input unit 15 that is realized by a proximity sensor or the like (for example, a result of detection by the proximity sensor).

The configuration of the information processing apparatus 10 according to the present embodiment has been explained in detail above. Next, expression examples of the space area S by the display control unit 11 are explained with reference to the drawings.

2-2. Expression Examples of a Space Area

Expression Example 1

In an expression example 1, the space area S is expressed by displaying the space area S such that a stereoscopic object can be perceived at a periphery of an operating object that enters the space area S. With this arrangement, the user can recognize the space area S by actually setting a hand close to the space area S. The expression example 1 is explained below with reference to FIG. 6.

Figure 6:
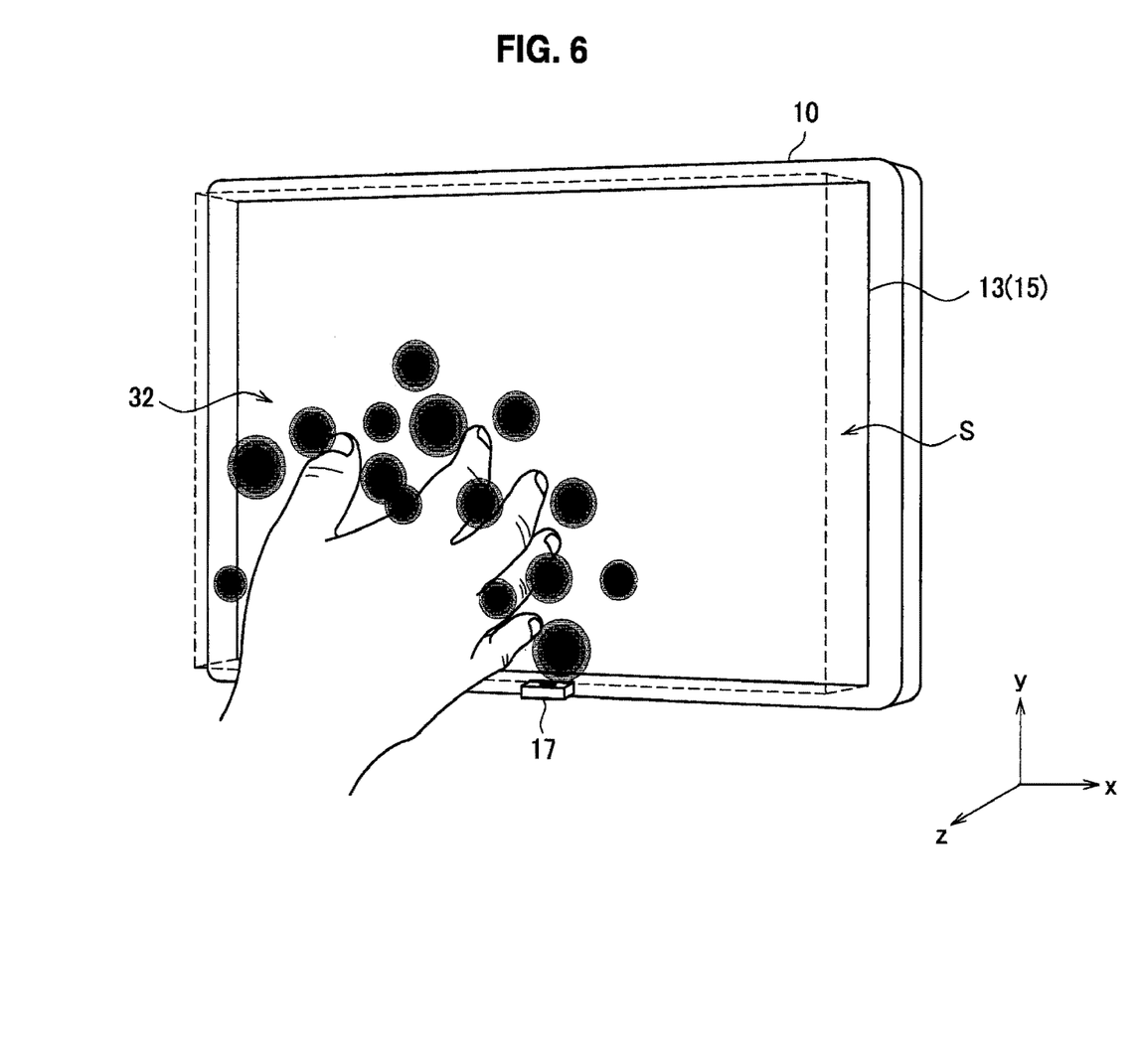
FIG. 6 is a perspective view for explaining an expression example 1.

FIG. 6 is a perspective view for explaining the expression example 1. As shown in FIG. 6, when the detecting unit 19 detects entrance of a user hand in the space area S, the display control unit 11 three-dimensionally displays particles 32 such that the particles 32 are perceived at the periphery of the user hand. The periphery of the user hand is determined based on three-dimensional coordinates of the operating object that are output from the detecting unit 19.

Three-dimensional display positions of the particles 32 may be dispersed inside and outside the space area S. According to such a configuration as described above, the user can recognize that the position of the hand is in the space area S, based on appearance of the particles 32. As another example, the particles 32 may be three-dimensionally displayed only in the space area S. According to this configuration, the user can recognize that the position of the hand is in the space area S based on appearance of the particles 32, and also can recognize an area at the periphery of the hand in the space area S. In this way, in both former and latter examples, the user can recognize that the position of the hand is in the space area S based on appearance of the particles 32. Therefore, the particles 32 work as stereoscopic objects that express the space area S.

The display control unit 11 may also three-dimensionally display the particles 32 for a constant period when a user hand is detected, and thereafter three-dimensionally display the particles 32 only when the user hand shifts to near a surface portion of the space area S. Further, the display control unit 11 may also three-dimensionally display the particles 32 at all time or at every constant time during a period in which a user hand is in the space area S.

With this arrangement, the user can intuitively grasp the surface portion or the inside of the space area S by operating in space at the periphery of the display unit 13.

Expression Example 2

In an expression example 2, a boundary of the space area S is expressed by displaying the space area S such that a stereoscopic object can be perceived at a surface portion of the space area S when a hand enters the space area S. With this arrangement, the user can recognize a surface of the space area S by actually setting a hand close to the space area S. The expression example 2 is explained below with reference to FIG. 7.

Figure 7:
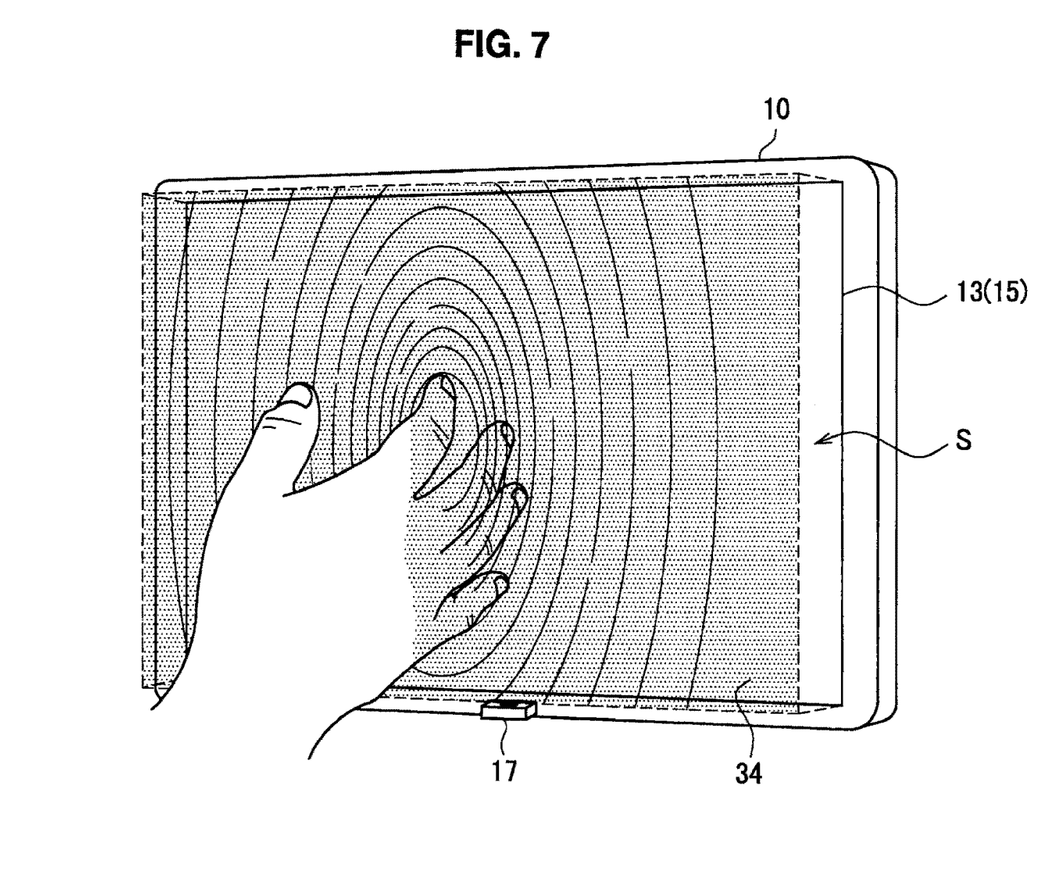
FIG. 7 is a perspective view for explaining an expression example 2.

FIG. 7 is a perspective view for explaining the expression example 2. As shown in FIG. 7, when the detecting unit 19 detects entrance of a user hand in the space area S, the display control unit 11 three-dimensionally displays a wave-shaped effect 34 that is perceived such that a wave is spread from a periphery of the user hand, at a surface portion of the space area S.

According to such a configuration as described above, because the user can recognize an interface of the space area S based on appearance of the wave-shaped effect 34, the wave-shaped effect 34 works as a stereoscopic object that expresses the space area S.

The display control unit 11 may also three-dimensionally display the wave-shaped effect 34 for a constant period when a user hand is detected, and thereafter three-dimensionally display the wave-shaped effect 34 only when the user hand shifts to near a surface portion of the space area S. Further, the display control unit 11 may also three-dimensionally display the wave-shaped effect 34 at all time or at every constant time during a period in which the user hand is at the surface portion of the space area S.

With this arrangement, the user can intuitively grasp the interface of the space area S by operating in space at the periphery of the display unit 13.

Expression Example 3

In an expression example 3, an interface of the space area S is expressed by displaying the space area S such that a stereoscopic object is automatically perceived at a surface portion of the space area S. The expression example 3 is explained below with reference to FIG. 8.

Figure 8:
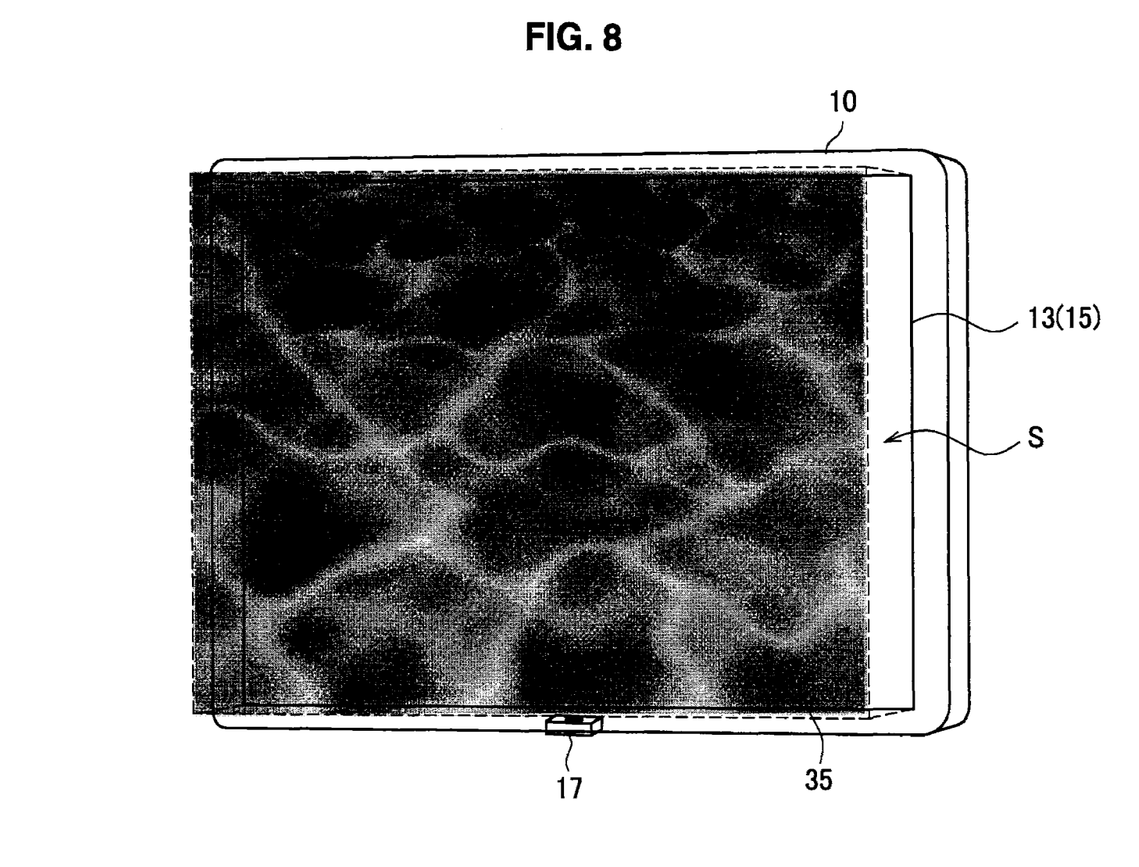
FIG. 8 is a perspective view for explaining an expression example 3.

FIG. 8 is a perspective view for explaining the expression example 3. As shown in FIG. 8, the display control unit 11 three-dimensionally displays a water-surface effect 35 at a surface portion of the space area S. The display control unit 11 may three-dimensionally display the water-surface effect 35 at all time or at every constant time until a user operation is detected, or may three-dimensionally display the water-surface effect 35 when a power source of the information processing apparatus 10 is turned on or when an operation input function in space is started in the information processing apparatus 10.

According to such a configuration as described above, because the user can recognize the interface of the space area S based on automatic appearance of the water-surface effect 35, the water-surface effect 35 works as a stereoscopic object that expresses the space area S.

With this arrangement, because the space area S is automatically expressed by the stereoscopic object at a predetermined timing, the user can intuitively grasp the interface of the space area S without actually performing an operation in space.

Expression Example 4

In an expression example 4, when a stereoscopic object that can be directly operated in the space area S is selected, the selection operation is fed back by three-dimensionally displaying particles at a periphery of the stereoscopic object. With this arrangement, the user can visually recognize that the user has selected the stereoscopic object in the space area S. The expression example 4 is explained below with reference to FIG. 9.

Figure 9:
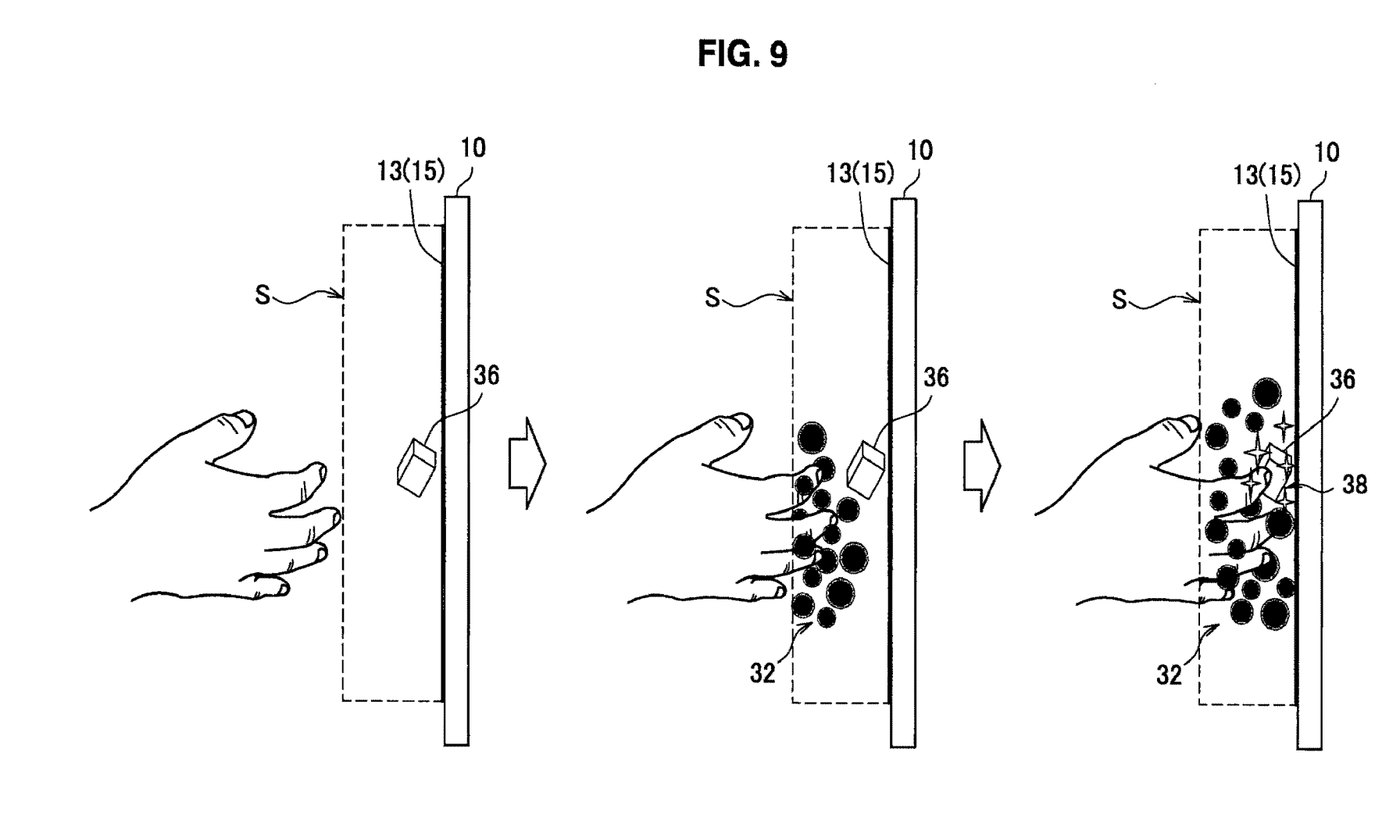
FIG. 9 is a state transitional view for explaining an expression example 4.

FIG. 9 is a state transitional view for explaining the expression example 4. As shown at left to center in FIG. 9, when the detecting unit 19 detects entrance of a user hand in the space area S, the display control unit 11 three-dimensionally displays the particles 32 such that the particles 32 are perceived at the periphery of the user hand.

In a similar manner to that in the expression example 1 described above, the particles 32 may be three-dimensionally displayed in dispersion inside and outside the space area S, or only in the space area S. In either case, because the user can recognize that the position of the hand is in the space area S based on appearance of the particles 32, the particles 32 work as stereoscopic objects that express the space area S.

Further, as shown at right in FIG. 9, the user hand shifts to a periphery of the stereoscopic object 36, and the stereoscopic object 36 to be selected is selected. The display control unit 11 determines that the stereoscopic object 36 is selected, when a three-dimensional position of an operating object (the user hand, in this case) detected by the detecting unit 19 matches a position of the stereoscopic object 36 that the user perceives. A distortion or a positional deviation occurs in the three-dimensional object based on the position of the user, as described above. Therefore, the display control unit 11 recognizes the position of the user face based on a photographed image of the user face, and controls display of the three-dimensional object according to the position of the user face.

When the stereoscopic object 36 is selected by the user in this way, the display control unit 11 further three-dimensionally displays a selected particle 38 at the periphery of the stereoscopic objects 36.

According to such a configuration as described above, the user can recognize that the stereoscopic object 36 to be operated has been selected at the hand based on appearance of the selected particle 38.

Figure 10:
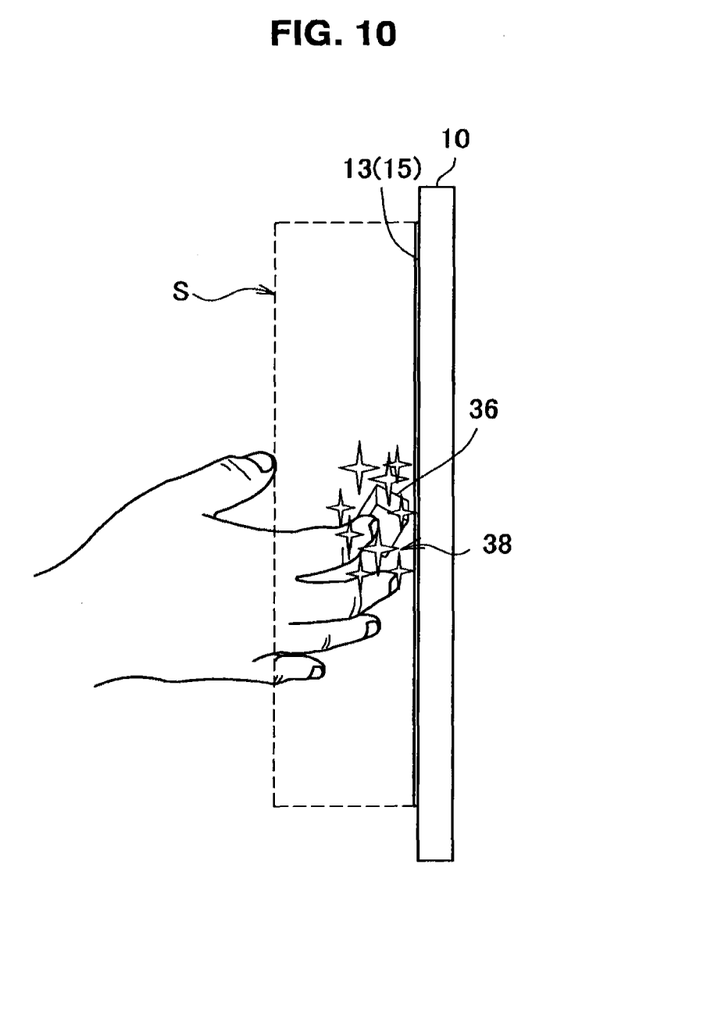
FIG. 10 is a view for explaining another example of the expression example 4.

As another example, the display control unit 11 may three-dimensionally display only the selected particle 38 when the stereoscopic object 36 is selected by the user. FIG. 10 is a view for explaining this further example of the expression example 4. As shown in FIG. 10, when the user selects the stereoscopic object 36, the display control unit 11 three-dimensionally displays the selected particle 38 at the periphery of the selected stereoscopic object 36.

According to the configuration as described above, the user can more clearly recognize feedback of a selection operation based on appearance of only the selected particle 38 when the stereoscopic object 36 to be operated is selected.

Expression Example 5

In an expression example 5, the space area S is expressed by a stereoscopic object, triggered by detection of the user. With this arrangement, wasteful power consumption due to display of a stereoscopic object during absence of the user can be avoided. The expression example 5 is explained below with reference to FIG. 11.

Figure 11:
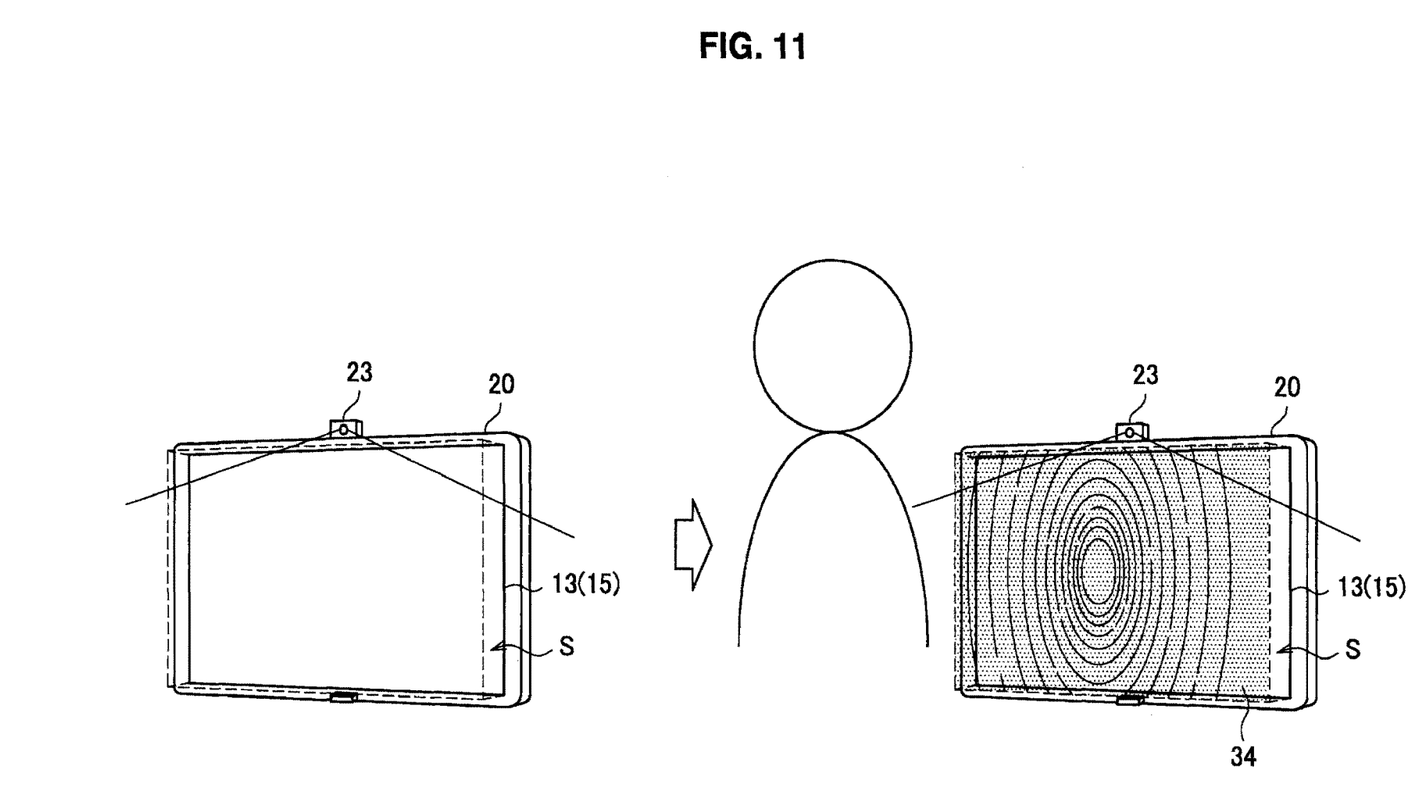
FIG. 11 is a perspective view for explaining an expression example 5.

FIG. 11 is a perspective view for explaining the expression example 5. The information processing apparatus 20 shown in FIG. 11 is obtained by providing a camera 23 as a sensor that detects the user, in the information processing apparatus 10 according to the embodiment described above. The sensor that detects the user is not limited to the camera 23, and may be an infrared sensor, for example.

As shown at a left side in FIG. 11, the camera 23 photographs a front of the information processing apparatus 20. As shown at a right side in FIG. 11, when a person is detected by the camera 23, the display control unit 11 three-dimensionally displays the wave-shaped effect 34 at a surface portion of the space area S.

In FIG. 11, although the wave-shaped effect 34 is shown at the surface portion as a stereoscopic object that expresses an interface of the space area S, a three-dimensional display that expresses the interface of the space area S is not limited to the wave-shaped effect 34, and may be the water-surface effect 35 shown in FIG. 8, for example.

3. Conclusion

As described above, according to the information processing apparatus 10 according to the embodiment of the present disclosure, it is possible to enable the user to recognize the space area S, by expressing by a stereoscopic object, the space area S in which a user operation is detected.

It should be understood by those skilled in the art that various modifications, combinations, sub-combinations and alterations may occur depending on design requirements and other factors insofar as they are within the scope of the appended claims or the equivalents thereof.

For example, the object that expresses the space area is not limited to the images shown in the expression example 1 to the expression example 5 described above. It may be arranged such that when a hand enters the space area, an object that is perceived such that light is spread from the hand is three-dimensionally displayed, for example.

An expression example obtained by combining the expression example 1 to the expression example 5 is also included in a technical scope of the present disclosure.

In the embodiment described above, although the information processing apparatus 10 according to the present disclosure has been explained by the example that realizes the information processing apparatus 10 by a tablet computer, the present technology is not limited to this example. For example, the information processing apparatus 10 according to the present disclosure may be a control apparatus that mainly has the display control unit 11 and the detecting unit 19 that have been explained with reference to FIG. 2. In this case, such a control apparatus controls a display apparatus that mainly has the display unit 13 and the operation input unit 15. Further, such a display apparatus is externally provided with the camera 17. An information processing system that has such a control apparatus and such a display apparatus is also included in the present technology.

The information processing apparatus according to the present disclosure may be a head-mounted display. In this case, a camera that is included in the head-mounted display photographs an operation of the user in space. It may be arranged such that a display control unit that is included in the head-mounted display three-dimensionally displays an object such that the object is perceived in a space area in which a user operation is detected.

Further, configurations of the information processing apparatus 10 and the information processing apparatus 20 according to the embodiment described above may be also realized by hardware configurations such as a central processing unit (CPU), a read only memory (ROM), and a random access memory (RAM).

Further, a computer program that exhibits functions equivalent to those of the configurations of the information processing apparatus 10 and the information processing apparatus 20 according to the embodiment described above can be also prepared. A non-transitory recording medium that stores the computer program is also provided. Examples of the recording medium include a magnetic disc, an optical disc, a magneto optical disc, and a flash memory. Further, the computer program may be distributed via a network, for example, without using a recording medium.

Additionally, the present technology may also be configured as below.

(1)
An apparatus comprising:
a sensor configured to detect an object in a space; and
a display control unit configured to control a display unit to display a reference object such that the reference object appears to be located in the space.

(2)
The apparatus according to (1), further comprising:
the display unit configured to display an image.

(3)
The apparatus according to (1) or (2), and a lens and a wherein the sensor detects the object in the space adjacent to a surface of the display unit.

(4)
The apparatus according to (1) or (2), wherein the display control unit controls the display unit to display an image of a wave as the reference object.

(5)
The apparatus according to any of (1), (2) or (4), wherein the display control unit controls the display unit to display an image of a plurality of particles as the reference object.

(6)
The apparatus according to any of (1), (2), (4) or (5), wherein the display control unit controls the display unit to display the reference object at a fixed location in the space.

(7)
The apparatus according to any of (1), (2) or (4) to (6), wherein the display control unit controls the display unit to display the reference object at an outer surface of the space.

(8)
The apparatus according to any of (1), (2) or (4) to (7), wherein the display control unit controls the display unit to display the reference object at the location of the object detected by the sensor.

(9)
The apparatus according to any of (1), (2) or (4) to (8), wherein the display control unit controls the display unit to display the reference object at the location of an image selected by the object.

(10)
The apparatus according to any of (1), (2) or (4) to (9), wherein the display control unit controls the display unit such that no image is displayed on the display unit if the sensor does not detect any objects.

(11)
The apparatus according to any of (1), (2) or (4) to (10), wherein the sensor includes at least one infrared camera.

(12)
The apparatus according to any of (1), (2) or (4) to (11), wherein the sensor detects the object which is a part of a body of a user.

(13)
The apparatus according to any of (1), (2) or (4) to (12), wherein the reference object is a stereoscopic object located at a position of an operation of the object.

(14)
A method comprising:
detecting an object in a space; and
controlling a display unit to display a reference object such that the reference object appears to be located in the space.

(15)
A non-transitory computer readable medium encoded with a program that, when loaded on a processor, causes the processor to perform a method comprising:
detecting an object in a space; and
controlling a display unit to display a reference object such that the reference object appears to be located in the space.

Furthermore, the present technology may also be configured as below.

(1)

An information processing apparatus including:

an operation detecting unit that detects an operation in space; and a display control unit that expresses, by a stereoscopic object, a space area in which an operation in space is detected by the operation detecting unit.

(2)

The information processing apparatus according to (1), wherein the display control unit displays such that the stereoscopic object is perceived at a periphery of an operation position of the operation detected in the space area.

(3)

The information processing apparatus according to (1) or (2), wherein the display control unit displays such that the stereoscopic object is perceived at a surface portion of the space area.

(4)

The information processing apparatus according to any one of (1) to (3), wherein the display control unit displays such that the stereoscopic object is perceived at a periphery of an object, when the object is selected in the space area by the operation detecting unit.

(5)

The information processing apparatus according to any one of (1) to (4), wherein the information processing apparatus includes:

a user detecting unit that detects a user, and the display control unit expresses the space area by the stereoscopic object, when a user is detected by the user detecting unit.

(6)

The information processing apparatus according to any one of (1) to (5), wherein the display control unit expresses the stereoscopic object at every constant time.

(7)

An information processing method including:

detecting an operation in space; and expressing, by a stereoscopic object, a space area in which an operation in space is detected by the detecting step.

(8)

A program that causes a computer to execute:

a process of detecting an operation in space; and a process of expressing, by a stereoscopic object, a space area in which an operation in space is detected by the detecting process.

(9)

The program according to (8), wherein the program causes a computer to execute a process of displaying such that the stereoscopic object is perceived at a periphery of an operation position of the operation detected in the space area.

(10)

The program according to (8) or (9), wherein the program causes a computer to execute a process of displaying such that the stereoscopic object is perceived at a surface portion of the operation area.

(11)

The program according to any one of (8) to (10), wherein the program causes a computer to execute a process of displaying such that the stereoscopic object is perceived at a periphery of an object, when an operation of selecting the object in the space area is detected.

(12)

The program according to any one of (8) to (11), wherein the program causes a computer to execute:

a process of detecting a user; and a process of expressing the space area by the stereoscopic object when the user is detected.

(13)

The program according to any one of (8) to (12), wherein the program causes a computer to execute a process of displaying the stereoscopic object such that the space area is expressed at every constant time.

What is claimed is:

1. An apparatus, comprising:
   a display unit;
   a sensor configured to detect an operating object within a three-dimensional trigger zone adjacent to the display unit,
   wherein the three-dimensional trigger zone has a length and a width defined by a length and a width of the display unit, respectively, and
   wherein a depth of the three-dimensional trigger zone, in a direction perpendicular to a face of the display unit, is set to a value; and
   a display control unit implemented by circuitry and configured to control the display unit to:
     display a first stereoscopic object within the three-dimensional trigger zone;
     display, within the three-dimensional trigger zone, a second stereoscopic object at a periphery of a first space occupied by the operating object within the three-dimensional trigger zone based on entry of the operating object within the three-dimensional trigger zone; and
     display, together with the first stereoscopic object and the second stereoscopic object, a third stereoscopic object at a periphery of a second space occupied by the first stereoscopic object within the three-dimensional trigger zone based on a selection of the first stereoscopic object by the operating object.

2. The apparatus according to claim 1, wherein the display control unit is further configured to control the display unit to display the second stereoscopic object such that the second stereoscopic object appears to be located within the three-dimensional trigger zone for a time period in which the operating object is detected within the three-dimensional trigger zone.

3. The apparatus according to claim 1, wherein the sensor is positioned at a periphery of the display unit.

4. The apparatus according to claim 1, wherein the display unit is configured to display an image.

5. The apparatus according to claim 1, wherein the value, that defines the depth of the three-dimensional trigger zone, is defined by an edge of an angle of view of the sensor.

6. The apparatus according to claim 1, wherein the display control unit is further configured to control the display unit to display an image of a wave or a plurality of particles as the second stereoscopic object or the third stereoscopic object.

7. The apparatus according to claim 1, wherein the display control unit is further configured to control the display unit to display the second stereoscopic object and the third stereoscopic object at fixed locations within the three-dimensional trigger zone.

8. The apparatus according to claim 1, wherein the display control unit is further configured to control the display unit to display the second stereoscopic object at an outer surface of the three-dimensional trigger zone.

9. The apparatus according to claim 1, wherein the display control unit is further configured to control the display unit to display the second stereoscopic object at a location of the operating object detected by the sensor.

10. The apparatus according to claim 1, wherein the display control unit is further configured to control the display unit to display the third stereoscopic object at a location of the first stereoscopic object selected by the operating object.

11. The apparatus according to claim 1, wherein the sensor comprises at least one infrared camera.

12. The apparatus according to claim 1, wherein the operating object is a part of a body of a user.

13. The apparatus according to claim 1, wherein the second stereoscopic object is located at a position of an operation of the operating object.

14. The apparatus according to claim 1, wherein the sensor is directed to a plane parallel to the face of the display unit.

15. A method, comprising:
  detecting, by a sensor, an operating object within a three-dimensional trigger zone adjacent to a display unit, wherein the three-dimensional trigger zone has a length and a width defined by a length and a width of the display unit, respectively,
  wherein a depth of the three-dimensional trigger zone, in a direction perpendicular to a face of the display unit, is set to a value;
  displaying a first stereoscopic object within the three-dimensional trigger zone;
  displaying, based on entry of the operating object within the three-dimensional trigger zone, a second stereoscopic object at a periphery of a first space occupied by the operating object within the three-dimensional trigger zone; and
  displaying, together with the first stereoscopic object and the second stereoscopic object, a third stereoscopic object at a periphery of a second space occupied by the first stereoscopic object within the three-dimensional trigger zone based on a selection of the first stereoscopic object by the operating object.

16. The method according to claim 15, further comprising:
  displaying the second stereoscopic object such that the second stereoscopic object appears to be located within the three-dimensional trigger zone for a time period in which the operating object is detected within the three-dimensional trigger zone.

17. A non-transitory computer-readable storage medium having stored thereon, computer-executable instructions that when executed by a computer, cause the computer to operations, the operations comprising:
  detecting, by a sensor, an operating object within a three-dimensional trigger zone adjacent to a display unit, wherein the three-dimensional trigger zone has a length and a width defined by a length and a width of the display unit, respectively,
  wherein a depth of the three-dimensional trigger zone, in a direction perpendicular to a face of the display unit, is set to a value;
  displaying a first stereoscopic object within the three-dimensional trigger zone;
  displaying, based on entry of the operating object within the three-dimensional trigger zone, a second stereoscopic object at a periphery of a first space occupied by the operating object within the three-dimensional trigger zone; and
  displaying together with the first stereoscopic object and the second stereoscopic object, a third stereoscopic object at a periphery of a second space occupied by the first stereoscopic object within the three-dimensional trigger zone based on a selection of the first stereoscopic object by the operating object.

18. The non-transitory computer-readable storage medium according to claim 17, further comprising:
  displaying the second stereoscopic object such that the second stereoscopic object appears to be located within the three-dimensional trigger zone for a time period in which the operating object is detected within the three-dimensional trigger zone.

* * * * *